Figure 1:
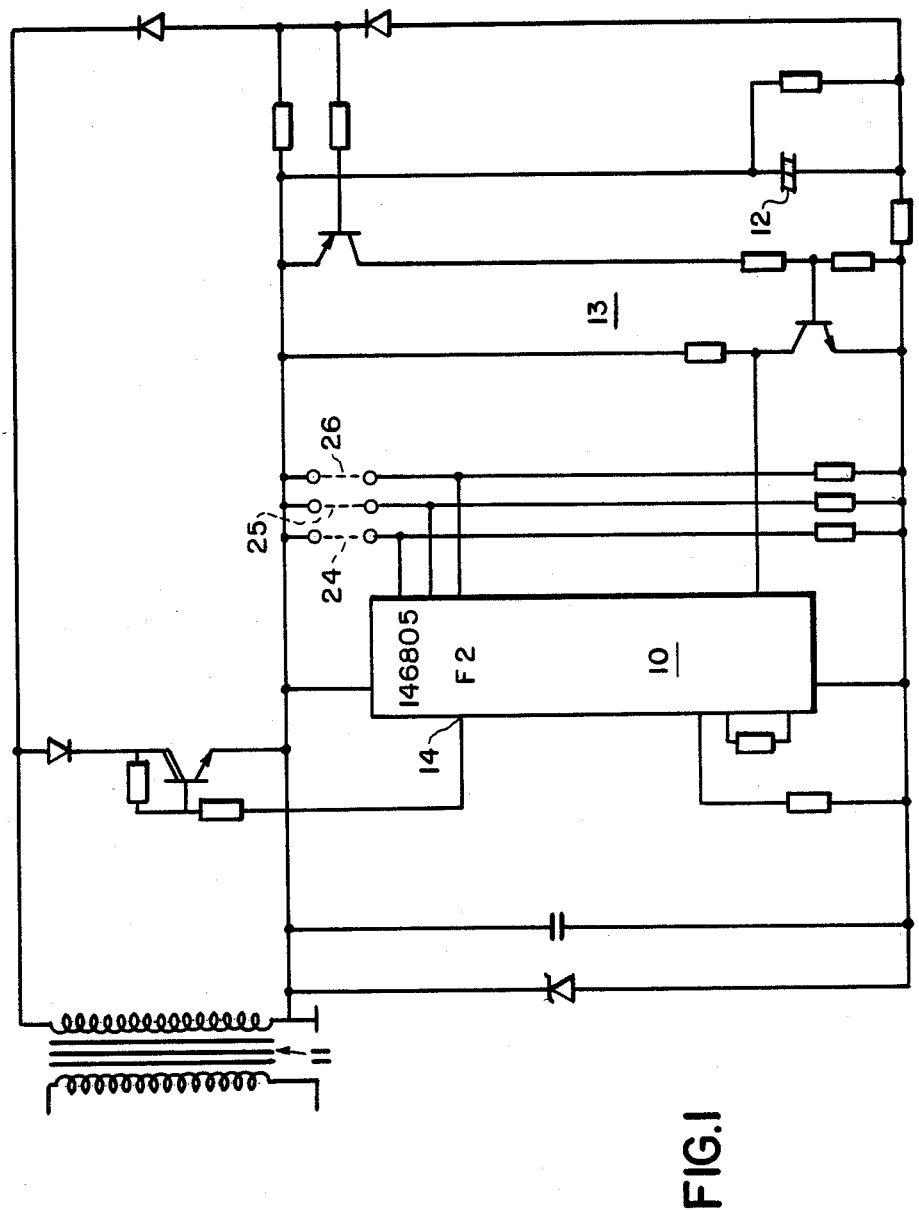

United States Patent [19]
Andreasson

[11] Patent Number: 4,570,595
[45] Date of Patent: Feb. 18, 1986

[54] IGNITION DEVICE OF AN I.C. ENGINE
[75] Inventor: Bo C. Andreasson, Gothenburg, Sweden
[73] Assignee: Aktiebolaget Electrolux, Stockholm, Sweden
[21] Appl. No.: 596,944
[22] Filed: Apr. 5, 1984
[30] Foreign Application Priority Data
Apr. 15, 1983 [SE] Sweden ............................. 8302114
[51] Int. Cl.$^4$ ............................................. F02P 5/15
[52] U.S. Cl. .................................... 123/418; 123/335
[58] Field of Search ............... 123/334, 335, 329, 417, 123/418

[56] References Cited
U.S. PATENT DOCUMENTS

| | | | |
|---|---|---|---|
| 4,075,989 | 2/1978 | Nagasawa | 123/418 |
| 4,144,859 | 3/1979 | Ohki et al. | 123/335 |
| 4,261,312 | 4/1981 | Hart | 123/418 |
| 4,378,769 | 4/1983 | Haubner et al. | 123/418 X |
| 4,385,601 | 5/1983 | Orova et al. | 123/335 |
| 4,385,617 | 5/1983 | Nakata et al. | 123/418 X |

Primary Examiner—Charles J. Myhre
Assistant Examiner—W. R. Wolfe
Attorney, Agent, or Firm—Alfred E. Miller

[57] ABSTRACT

A microcomputer is used in the invention for the control of the ignition function of an ignition system of an i.c. engine. The limitation of r.p.m. of the engine at high r.p.m. is brought about by an acurately developed procedure of delayed ignition in two steps. The control of ignition timing is carried out by counting timer pulses between reference points, whereby the number of pulses between such points constitutes an address of a position in the ROM of the computer, where a reference number of the ignition time is stored. In manufacturing of a great assortment of engines several demands for limitation of maximum r.p.m. can be fulfilled in that the microcomputer has a spacing for storing several characteristics. The selection of a particular characteristic for a sort of engine is made by establishing permanent connections (or disconnections) in separate inputs of the computer which reads the combination and choses the corresponding characteristic.

4 Claims, 3 Drawing Figures

IGNITION DEVICE OF AN I.C. ENGINE

The present invention relates to an ignition system of an i.c. engine provided with a special protection against over-speeding of the engine.

A great over-speeding of the engine will give a high strain on its movable parts and is disagreeable to the environment due to the sound effect. Over-speeding occurs in an engine which works on a high load which suddenly vanishes. Such a case occurs by a motor saw at the moment the sword just cuts through a work piece. Before the operator manages to release the throttle control the engine speeds up to its highest possible r.p.m.

In the art of ignition circuitry protection arrangements are known which include coils and magnet poles which cooperate upon the exceeding of a predetermined r.p.m. in order to eliminate the ignition spark and thereby prohibit the increase of r.p.m. Such arrangements require a good adjustment and are sensitive to external stress.

In the present invention a microcomputer is used for the control of the ignition function and therewith also provides a limitation of r.p.m. by an accurately developed procedure of delayed ignition at a predetermined r.p.m. The use of a microcomputer has in this respect also the advantage of having space in its static memory for storing several functions of delayed ignition. In this connection the microcomputer can be used in a great assortment of engines which have different limitations of r.p.m., whereby the selection of a proper function of a special engine is made by performing permanent connections or disconnections on separate inputs of the computer which reads the inputs and choses the appropriate function.

Figure 2:
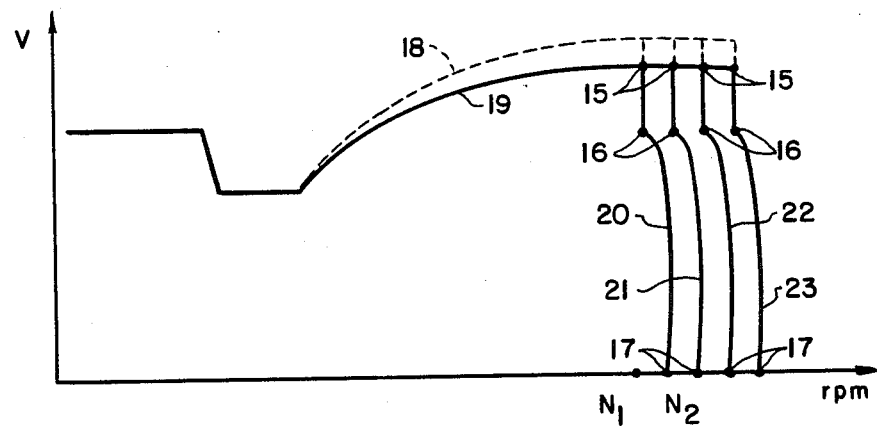
Figure 3:
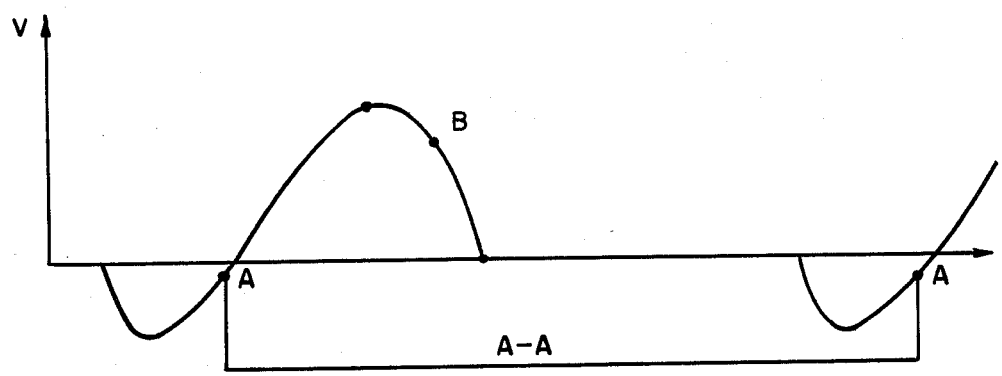

An embodiment of an ignition device according to the invention is described in the following with reference to the accompanying drawings which show in:

FIG. 1 a wiring diagramme of the ignition device,

FIG. 2 a diagramme of the function of ignition time/r.p.m.,

FIG. 3 a primary voltage curve.

A wiring diagramme of the ignition device is shown in FIG. 1, the device including a microcomputer 10. The current supply to the electronic circuits and the computer is derived from the negative half-waves of the primary voltage (FIG. 3) from an ignition generator, 11 the circuit being connected to keep the capacitor 12 charged to an operating voltage. A transistor amplifier 13 is connected to output a pulse at the time of occurrence of a valve on the voltage curve, this valve in the present case being 0.6 V before the curve passes zero on the ascending part thereof. The pulse is supplied to the microcomputer as a start signal of a procedure which is herewith described in broad outline.

The input to which the signal is supplied is scanned and the time A (FIG. 3) is stored as a reference point. This storing is possible since the microcomputer has a timer working on a fixed frequency. At every reference point the number of pulses passing after the preceeding reference point is registered. The number of pulses corresponds to 360° of the crankshaft. By dividing the number of pulses by a predetermined number, e.g. 16, a number of pulses remains which corresponds to an ignition angle 360/16=22.5°. This number is called the reference number and is a memory data stored in the static memory of the computer. The reference number can be dependent of the r.p.m. and is at low r.p.m. inversely proportional (a straight horizontal line in FIG. 2). When the number of timer pulses reaches the said reference number (by comparing the numbers in an AND-circuit) the ignition is initiated by an output 14 of the computer. The timer is set to zero every time the reference point passes and a counting to the reference number takes place for every spark. At low r.p.m. ignition takes place at the point B on the curve in FIG. 3, since the ignition angle then is constant, whereby ignition is locked in phase to the voltage curve. At higher r.p.m. the reference number is dependent on r.p.m., making an ignition timing curve according to FIG. 2. The number of time pulses between A-A directly or indirectly forms an address to a position in the memory of the computer where the reference number corresponding to the ignition time is stored.

In FIG. 2 the relation between ignition time (angle) and r.p.m. is shown in a diagramme. The limitation of r.p.m. is effected at the sloping part of the curve, and brought about by an accurately developed procedure of delaying the ignition in two steps. In the first step, 15-16, a momentary retarding of the spark takes place through an angle of from 1°-10° on the crankshaft. Such a delay brings about an essential decrease of the torque of the engine so that the r.p.m. remains at about $N_1$ if the torque is not enough for a further increase of r.p.m. In the second step, 16-17, a further retardation of the spark takes place along the sloping curve between these points and between the corresponding r.p.m. $N_1$ and $N_2$. Since ignition sparks in the range are still generated, here combustion takes place in the engine, so that no combustible gas is exhausted. In order to make sure that a limitation of r.p.m. takes place at the highest allowable r.p.m. $N_2$, no sparks are generated above this r.p.m.

In order to obtain an enlarged field for use of an ignition device with such a limitation of r.p.m. this device has been provided with additional circuits which make the device adaptable to a great assortment of engines, in which different demands for ignition angle and limitation of r.p.m. exist. Several ignition timing curves 18, 19 can be stored in the computer which has special inputs for a code giving information of the selection of a specific curve. Such a selection can also include a limitation of highest r.p.m. according to one of the curves 20,21,22,23. The said code is produced by permanent connections or disconnections 24,25,26 of the inputs to ground. Each engine has such a code attached to the engine when it is manufactured, and the code always accompanies the engine.

I claim:

1. A method for controlling spark timing of an internal combustion engine, comprising producing a number of pulses corresponding to engine r.p.m., storing the number of said pulses, and controlling the timing of ignition of the engine in response to said stored number, said step of controlling comprising producing momentary retardation of ignition through an angle of from 1°-10° on the crankshaft at an r.p.m. $N_1$, and then producing still greater ignition angle retardation following a sloping characteristic to an r.p.m. $N_2$ higher than $N_1$.

2. A method for timing ignition in an ignition device for an internal combustion engine, the ignition device having a magnetic system generating ignition energy and an ignition coil, a spark plug connected to a secondary winding thereof and a primary winding connected to a triggerable ignition switch, a detector for indicating a reference time for every spark and a microcomputer having a static memory, a timer and a comparator in which timer pulses and reference numbers from the timer and the memory, respectively, are compared for supplying a trigger pulse to the ignition switch by way of output circuits; said method comprising storing reference numbers in said static memory corresponding to the r.p.m. of said internal combustion engine, and, in response to a determined r.p.m. $N_1$ of said engine, first producing a momentary retardation of ignition through an angle of from 1°–10° on the crankshaft, and then subsequently producing a still further retarded ignition angle having a characteristic sloping to an r.p.m. $N_2$ higher than $N_1$, and stopping the spark at the r.p.m. $N_2$.

3. In an ignition device for an I.C. engine, the device having a magnetic system generating ignition energy and an ignition coil, a spark plug connected to a secondary winding thereof and a primary winding connected to a triggerable ignition switch, a detector indicating a reference time for every spark and a microcomputer having a static memory, a timer and a comparator in which timer pulses and reference numbers from the timer and the memory, respectively, are compared and via output circuits supply a trigger pulse to the ignition switch, the improvement wherein said memory stores positions for reference numbers which at a determined r.p.m. $N_1$ firstly produce a momentary retardation of ignition through an angle of from 1°–10° on the crankshaft and then after this retardation produce a still further retardation in the ignition angle with a characteristic sloping to a higher r.p.m. $N_2$ at which r.p.m. the spark is stopped.

4. An ignition device according to claim 3, wherein the memory is in the form of part memories and comprises storage positions for several series of reference numbers which series describe different characteristics of said retarded ignition, and that these part memories are allotted to inputs of the computer with permanent connections and disconnections, respectively, to ground joining a particular memory in the device.

* * * * *